United States Patent
Tanaka

(10) Patent No.: US 9,025,032 B2
(45) Date of Patent: May 5, 2015

(54) IMAGING SYSTEM AND PIXEL SIGNAL READOUT METHOD

(75) Inventor: Hiroyuki Tanaka, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 539 days.

(21) Appl. No.: 13/226,703

(22) Filed: Sep. 7, 2011

(65) Prior Publication Data
US 2012/0057028 A1 Mar. 8, 2012

(30) Foreign Application Priority Data
Sep. 8, 2010 (JP) .................................. 2010-201053

(51) Int. Cl.
H04N 5/225 (2006.01)
H04N 5/232 (2006.01)

(52) U.S. Cl.
CPC ....... *H04N 5/23219* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 7,453,506 B2 * | 11/2008 | Li | 348/333.12 |
| 2005/0180611 A1 * | 8/2005 | Oohashi et al. | 382/118 |
| 2007/0263997 A1 * | 11/2007 | Hirai et al. | 396/123 |
| 2008/0181506 A1 * | 7/2008 | Nishizawa | 382/190 |
| 2008/0218595 A1 * | 9/2008 | Kawahara | 348/222.1 |
| 2008/0252773 A1 * | 10/2008 | Oishi | 348/347 |
| 2008/0316325 A1 * | 12/2008 | Nakahara | 348/222.1 |
| 2009/0087042 A1 * | 4/2009 | Steinberg et al. | 382/118 |
| 2009/0091633 A1 | 4/2009 | Tamaru | |
| 2009/0095880 A1 | 4/2009 | Otsuki | |
| 2009/0141141 A1 * | 6/2009 | Onozawa | 348/222.1 |
| 2009/0322885 A1 * | 12/2009 | Ogasawara et al. | 348/169 |
| 2010/0177214 A1 * | 7/2010 | Ozaki et al. | 348/234 |

FOREIGN PATENT DOCUMENTS

| | | | |
|---|---|---|---|
| EP | 609843 | * | 8/1994 |
| JP | 2004-242010 A | | 8/2004 |
| JP | 2008-064797 | | 3/2008 |
| JP | 2009-094725 | | 4/2009 |
| JP | 2009-098317 | | 5/2009 |
| JP | 2010-008855 | | 1/2010 |

OTHER PUBLICATIONS

U.S. Appl. No. 13/156,611 to Yoshitaka Kimura et al., filed Jun. 9, 2011.
U.S. Appl. No. 13/226,729 to Hiroyuki Tanaka et al., filed Sep. 7, 2011.
U.S. Appl. No. 13/226,719 to Hiroyuki Tanaka et al., filed Sep. 7, 2011.
U.S. Appl. No. 13/226,738 to Hiroyuki Tanaka et al., filed Sep. 7, 2011.
Japan Office action, dated Apr. 15, 2014 along with an english translation thereof.

* cited by examiner

*Primary Examiner* — Frederick Bailey
(74) *Attorney, Agent, or Firm* — Greenblum & Bernstein P.L.C.

(57) ABSTRACT

An imaging system is provided that includes a target detector, a readout area determiner and a readout processor. The target detector detects a target subject from an effective pixel area of an image sensor. The readout area determiner defines a readout area within the effective pixel area, the readout area corresponding to a detected target. The readout processor reads out only pixel signals within the readout area. A partial area within the readout area is redefined as the readout area when the size of the original readout area is greater than a predetermined size.

20 Claims, 6 Drawing Sheets

IMAGING SYSTEM AND PIXEL SIGNAL READOUT METHOD

BACKGROUND OF THE INVENTION

1. Field of the Invention

The present invention relates to a device for reading out image signals from an image sensor and a method thereof.

2. Description of the Related Art

A contrast-detect autofocus (AF) function has been employed by various types of digital cameras where, in general, a focusing image is temporarily displayed on a monitor of the camera for a photographer to check whether or not the image is adequately in focus. However, the size of the monitor provided on the camera is usually not sufficient for a photographer to verify the quality or conditions of the focusing image when the entire image is represented on the display. In order to overcome such problems, a camera disclosed in KOKAI 2004-242010 enlarges an area with the highest degree of focusing and further indicates a subarea within the enlarged image having the highest focusing degree by framing the subarea.

SUMMARY OF THE INVENTION

Although a high-speed autofocus operation is preferable, the conventional contrast-detect autofocus is at a disadvantage when carrying out high-speed focusing because it must read out all signals within an actual pixel area (an area within an effective pixel area in which the quality of an image is guaranteed).

Therefore one aspect of the present invention is to enable high-speed pixel signal readout from an image sensor, within an area including a target subject.

According to the present invention, an imaging system is provided that includes a target detector, a readout area determiner and a readout processor.

The target detector detects a target subject from an effective pixel area of an image sensor. The readout area determiner defines a readout area within the effective pixel area; the readout area corresponding to a detected target. The readout processor reads out only pixel signals within the readout area. A partial area within the readout area is redefined as the readout area when the size of the readout area is greater than a predetermined size.

Further, according to another aspect of the present invention, a pixel signal readout method is provided that includes detecting a target subject from an effective pixel area of an image sensor, defining a readout area within the effective pixel area with the readout area corresponding to a detected target, reading out only pixel signals within the readout area, and redefining a partial area within the readout area as the updated readout area when the size of the original readout area is greater than a predetermined size.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
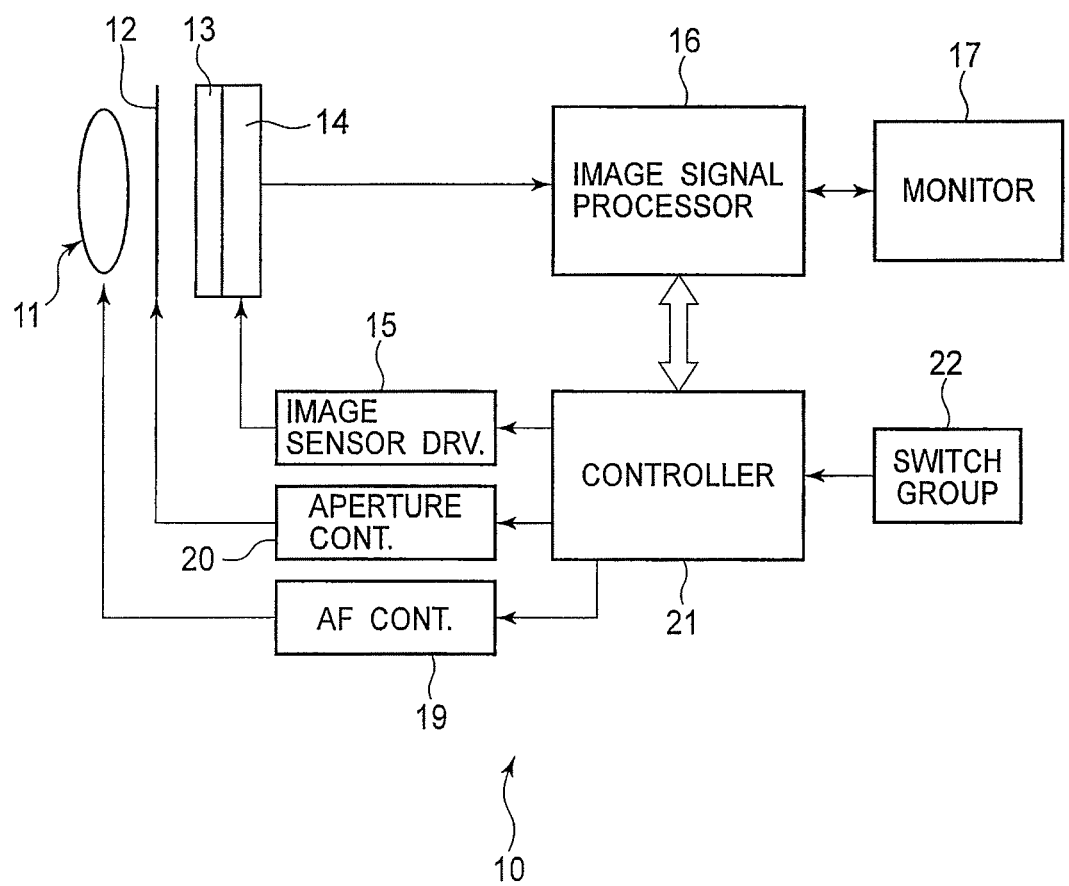
FIG. 1 is a block diagram schematically illustrating the general structure of a digital camera of an embodiment of the present invention.

The present invention is described below with reference to the embodiments shown in the drawings.

FIG. 1 is a block diagram schematically illustrating the general structure of a digital camera to which an embodiment of the present invention is applied.

The digital camera 10, for example, is a digital single-lens reflex camera. Light made incident to a lens system 11 forms an image on an imaging surface of an image sensor 14, for example, through an aperture 12 and a color filter array 13. The image sensor 14 may be controlled by drive signals from an image sensor driver 15. Image signals obtained by the image sensor 14 may be fed to an image signal processor 16 to be subjected to various types of image signal processing that are well known in the art, and in turn, the image may be displayed on a monitor 17.

An AF controller 19 may control the positions of the lenses in the lens system 11 to carry out the autofocus operation. Further, an aperture controller 20 may control the size of the aperture 12. Note that the image sensor driver 15, the AF controller 19 and the aperture controller 20 are controlled by instructions from a controller 21, and the controller 21 may perform various types of processes, including the autofocus operation (detailed later), based on the manipulation of switches in a switch group 22. The switch group 22 may include a release switch, AF button, dial switches, a touch panel, etc.

Figure 2A:
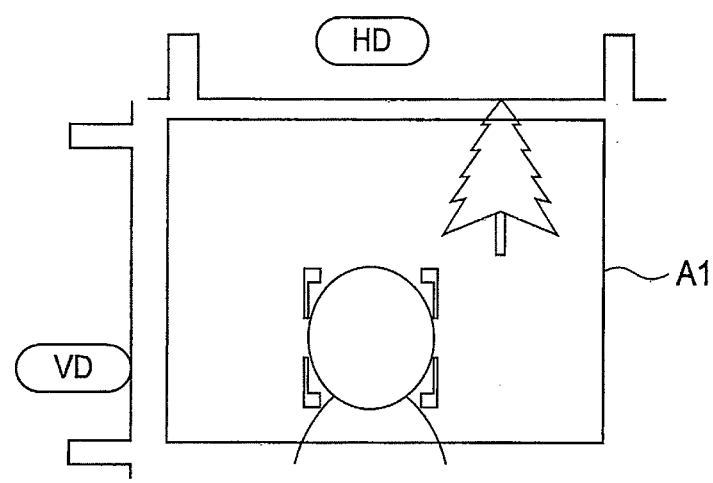
FIGS. 2A and 2B schematically illustrate the relationship between frame rates and readout areas.
Figure 2B:
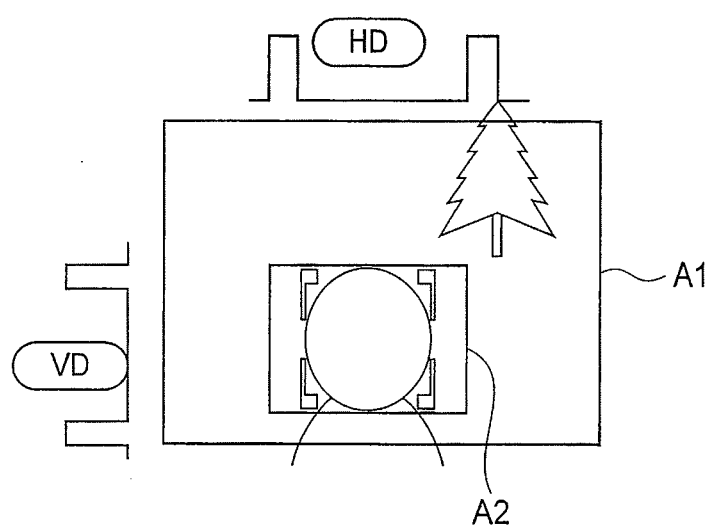

With reference to FIGS. 2A and 2B, the relationship between a frame rate and a readout area (CAF area) in the contrast-detect autofocus (CAF) operation of the present embodiment will be explained.

FIG. 2A schematically illustrates an area A1 that corresponds to an actual pixel area (or an effective pixel area) of the image sensor 14. Pixel signals of each horizontal line within the area A1 are read out sequentially in accordance with the period of the horizontal synchronizing signal HD, and all of the horizontal lines within the area A1 are read out in accordance with the vertical synchronizing signal VD that is composed of multiple horizontal lines. Namely, the number of pixels in the horizontal direction constituting the readout area is restricted by the period of the horizontal synchronizing signal HD and the number of pixels in the vertical direction constituting the readout area is restricted by the period of the vertical synchronizing signal VD. Further, the frame rate is determined by the vertical synchronizing signal VD.

In FIG. 2B, a face-detected area, which is detected by using a face detection procedure, is indicated by the four brackets within a surrounding image area A2, all of which is inside of the actual pixel area A1. The CAF operation applying the face detection method uses only the face-detected area or the area A2, thus once a face has been detected within the actual pixel area A1, image information other than that related to the face-detected area or the area A2 is unnecessary for the CAF operation. Therefore, in the present embodiment, the frame rate used in the CAF operation is increased to accelerate the CAF operation by reading out pixel signals from only the partial image area of the image sensor 14 that is actually used in the CAF operation.

Namely, as illustrated in FIG. 2B, when only the pixel signals within the area A2 are read out, the periods of the horizontal synchronizing signal HD and the vertical synchronizing signal VD are shortened because of the numbers of pixels in the vertical and horizontal directions are reduced compared to those in the actual pixel area A1, and in turn the frame rate is increased. Note that the widths of the horizontal synchronizing signal HD and vertical synchronizing signal VD in FIGS. 2A and 2B do not directly correspond to the length of time. Namely, one period of the vertical synchronizing signal VD actually includes as many periods of the horizontal synchronizing signal HD as the number of the horizontal lines.

Figure 3:
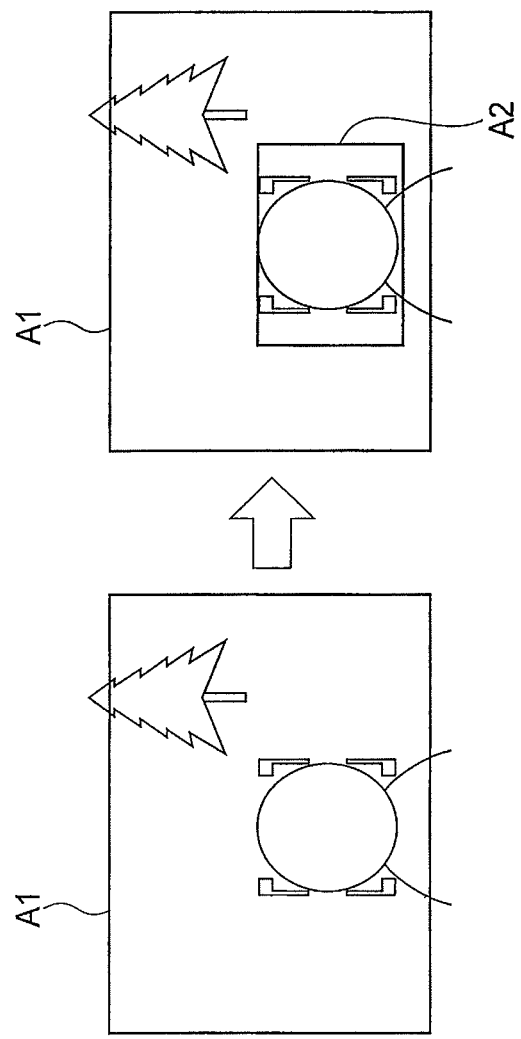
FIG. 3 illustrates an area that is determined as a CAF area when a single face with a small area is detected.
Figure 4:
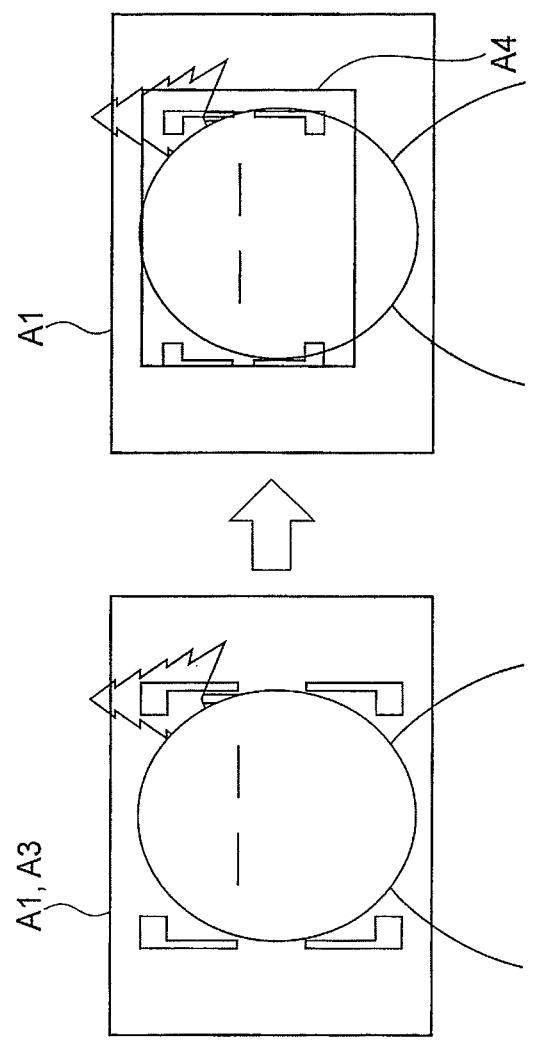
FIG. 4 illustrates an area that is determined as the CAF area when a single face with a large area is detected.
Figure 5:
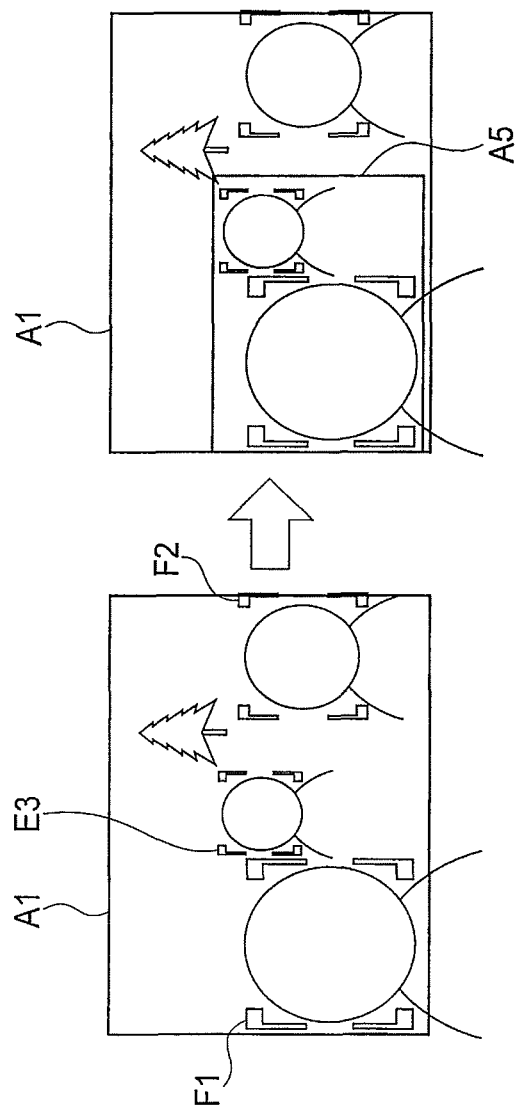
FIG. 5 illustrates an area that is determined as the CAF area when a plurality of faces is detected.

With reference to FIGS. 3-5, an outline of the readout operation of the pixel signals under the CAF operation of the present embodiment will be explained.

Three exemplary patterns of face-detected areas determined in the face detection process are illustrated on the left-hand side of FIGS. 3-5. In each of the figures, a face-detected area is indicated by an area of which four corners are designated by brackets, for example four L-style bracket symbols. Further, on the right-hand side of each figure a readout area (a CAF area) that is read out from the image sensor 14 during the CAF operation of the present embodiment, in the respective situations, is illustrated.

FIG. 3 corresponds to the situation illustrated in FIGS. 2A and 2B, where only one person's face is detected in the face detection procedure and the ratio of the face-detected area or the area A2 surrounding the face-detected area (an area slightly larger than the face-detected area) to the actual pixel area (or effective pixel area) A1 is relatively low and may even be below 50%. In such situation, the size of the area A2 may be determined to be small enough to set a sufficiently high frame rate for the CAF operation, thus the area A2 is defined as the CAF area. Note that the area A2 is an enlarged area of the face-detected area that has been increased on every side by a predetermined magnification. Different magnifications in the vertical and horizontal directions can also be used. Further, the magnification is normally set to a value greater than one but a value less than one can also be selected.

In FIG. 4, although only one person's face is detected within the actual pixel area (or the effective pixel area) A1, similar to the situation in FIG. 3, the situation in FIG. 4 corresponds to a case when the ratio of the face-detected area or an area A3 surrounding the face-detected area (an area slightly larger than the face-detected area) to the actual pixel area (or the effective pixel area) A1 is relatively high, such as 50% or more. FIG. 4 shows a peculiar case in which the area A3 coincides with the area A1 (100% occupancy). If the area A3 is defined as the CAF area in such situation, a sufficiently high frame rate may not be available in the CAF operation. Therefore, in the present embodiment a partial area A4 within the area A3, including the eyes at the center, is determined and set as the CAF area in such situation.

FIG. 5 corresponds to a case when a plurality of face-detected areas F1-F3 is detected within the actual pixel area (the effective pixel area) A1. In such case if an area, e.g. the smallest rectangular area including all of the face-detected areas F1-F3, is set as a CAF area, the size of the CAF area may be too large, as shown in FIG. 4, and a sufficiently high frame rate may not be available in the CAF operation. Therefore, in the present embodiment, only a portion of the face-detected areas F1-F3 is set as the CAF area. For example, in FIG. 5, the sizes (area or the number of pixels) of the face-detected areas F1-F3 are compared to each other and a rectangular area A5 including the largest face-detected area (F1) and the smallest face-detected area (F3) may be set as the CAF area. More specifically, the smallest rectangular area including the areas F1 and F3 may be defined as the CAF area.

This is due to the fact that the largest face-detected area can be regarded as it corresponds to the nearest face and the smallest face-detected area can be regarded as it corresponds to the farthest face. Namely, if the focusing operation is performed by comparing the contrast in an area including both the nearest and farthest areas, a sufficient degree of focusing can also be obtained for the other faces that exist between them.

Next, referring to the flowchart of FIG. 6, the high-speed CAF operation of the present embodiment will be explained.

Figure 6:
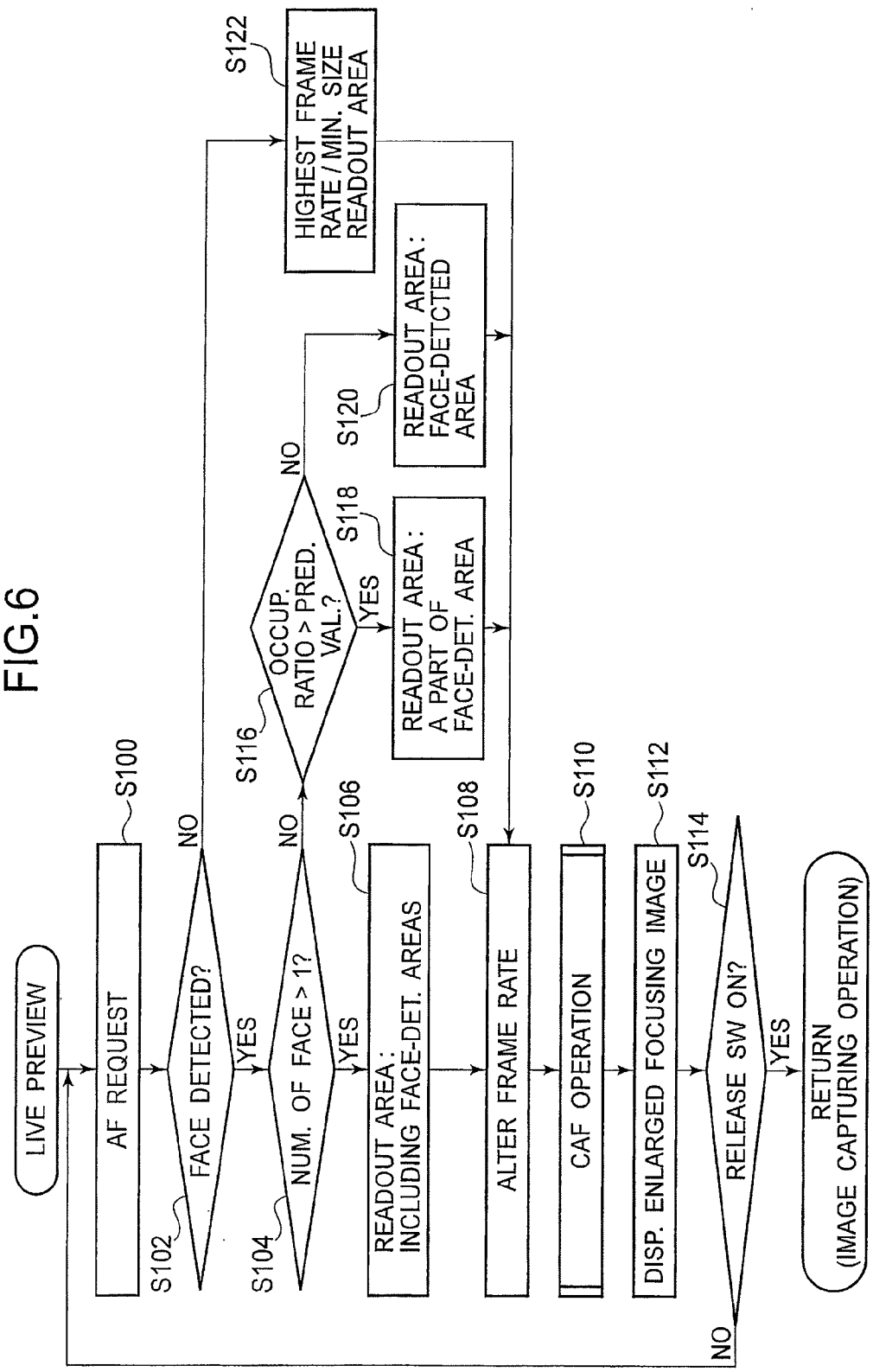
FIG. 6 is a flowchart of the CAF operation to which the pixel signal readout method of the present embodiment is applied.

The processes shown in FIG. 6 may be performed when a live preview or a through-the-lens image is displayed on the monitor. The high-speed CAF operation of the present embodiment starts when an AF request is detected in Step S100. Note that in FIG. 6 the high-speed CAF operation is used while a continuous AF mode applies the face detection procedure, which automatically tracks a target, as an example. Namely, in Step S100, whether the autofocus (AF) has been requested is determined while the continuous AF mode applying the face detection procedure is selected.

In Step S102, whether or not a face has been detected in the face detection procedure is determined. When a face(s) has been detected, whether the number of the detected faces is more than one is determined in Step S104. When it is determined that the number of the detected faces is greater than one, the rectangular area A5 including the largest face-detected area (F1) and the smallest face-detected area (F3), which has already been described with reference to FIG. 5, is set as the CAF area in Step S106. Further, in Step S108, the frame rate is altered to a rate corresponding to the CAF area set in Step S106.

In Step S110, only the image signals from the CAF area, which was set in Step S106, are read out at the frame rate set in Step S108. Namely, the conventional CAF operation is carried out by comparing the contrasts between images within the CAF area; those sequentially captured in cooperation with the AF controller 19 (see FIG. 1). When the CAF operation of Step S110 is completed, a focusing image of the CAF area is enlarged and displayed on the monitor 17 (see FIG. 1).

Thereafter, whether or not the release switch has been turned on is determined in Step S114. When the release switch has been turned on, the present process ends and the normal image capturing operation is started. On the other hand, when the release switch has not been turned on, the process returns to Step S100 and waits until a CAF request is detected.

When the number of face-detected areas is not plural, i.e., when only one face has been detected, an occupation ratio of the face-detected area or the area A2 surrounding the face-detected area divided by the actual pixel area (the effective pixel area) A1 is calculated in Step S116, and whether or not it is above a predetermined value (for example 50%) is determined.

When it is determined that the occupation ratio of the face-detected area or the area A2 surrounding the face-detected area is above the predetermined value, the rectangular area A4 surrounding the eyes within the face-detected area is set as the CAF area in Step S118, see FIG. 4. The frame rate is then altered to a rate that corresponds to the rectangular area A4 set as the CAF area in Step S108. In Step S110, the CAF operation is carried out for only the image signals read out from the CAF area set above, and a focusing image obtained by the CAF operation is enlarged and displayed on the monitor 17 in Step S112. Further, the processes from Step S100 are repeated until it is determined in Step 114 that the release switch has been turned on.

On the other hand, when it is determined in Step S116 that the occupation ratio of the face-detected area or the area A2 surrounding the face-detected area with respect to the actual pixel area (or the effective pixel area) A1 is below the predetermined value (for example 50%), the rectangular area A2 including the face-detected area and having the size slightly larger than the size of the face-detected area (see FIG. 3) is set as the CAF area in Step S120. The frame rate is then altered in Step S108 to a rate that corresponds to the rectangular area A2, which has been set as the CAF area, and the processes following Step S110 are performed as described previously.

Further, when it is determined in Step S102 that a face has not been detected, a preset or default area within the actual pixel area (the effective pixel area) having an occupation rate less than the above predetermined value (e.g., 50%) is set as the CAF area in Step S122, where the size of this preset area may be the smallest CAF area selected in the CAF operation. In Step S108, the frame rate is altered to the rate corresponding to this preset area and the processes following Step S110 are performed as described previously.

As described above, according to the present embodiment, the CAF area can always be determined to be smaller than the actual pixel area and a target area can be automatically selected in the contrast-detect auto focus procedure. Thereby, images used in the auto focus operation can be read out swiftly so that high-speed auto focusing is available.

Although the invention is applied to an auto focus operation in the present embodiment, it can also be applied to an automatic exposure or the like. Further, a target that is automatically detected in the CAF operation is not restricted to a face. It may also be a pet or an alternative subject that may be designated by a user. Furthermore, in the present embodiment the CAF area is redefined from a face-detected area to an area including eyes at the center, but the redefinition of the CAF area may be selected from a mouth or other distinct feature instead of the eyes as a target. When a target is not a face, a part of the target that has a distinct feature may be detected for determining the CAF area.

Although the present embodiment has been described for a single-lens reflex camera, the present invention is not restricted to a digital camera and may also applied to a device, including a cell phone and the like, which is provided with a digital camera.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2010-201053 (filed on Sep. 8, 2010), which is expressly incorporated herein, by reference, in its entirety.

The invention claimed is:

1. An imaging system, comprising:
   a target detector that detects a target subject from an effective pixel area of an image sensor and performs face detection;
   a readout area determiner that defines a readout area within said effective pixel area, said readout area corresponding to a detected face and being smaller than the effective pixel area;
   a readout processor that reads out only pixel signals within said readout area, utilizes only the pixel signals within the readout area to perform an autofocus operation, and changes a period of horizontal and vertical synchronization signals in association with a size of the readout area; and
   a partial area within said readout area being redefined as said readout area when a size of an originally defined readout area is greater than a predetermined size.

2. The imaging system as in claim 1, wherein said target detector is configured to perform automatic tracking of said target within said effective pixel area.

3. The imaging system as in claim 1, wherein the redefined area comprises a partial area of a face-detected area including eyes at the center of the redefined area.

4. The imaging system as in claim 1, wherein when said target detector detects a plurality of targets from said effective pixel area and when an area including all of said plurality of targets is larger than said predetermined size, an area including only a part of said plurality of targets is redefined as said readout area.

5. The imaging system as in claim 1, wherein a preset area is set as said readout area when no target has been detected.

6. The imaging system as in claim 1, wherein said imaging system comprises a digital camera.

7. The imaging system according to claim 1, the readout area being configured to correspond to a face detection area enlarged on each side by a predetermined magnification.

8. The imaging system according to claim 1, the readout processor being configured to perform the autofocus operation based only on the pixel signals within the readout area and further to focus an optical system of the imaging system on the detected face.

9. The imaging system according to claim 1, wherein, when said target detector detects a plurality of targets from said effective pixel area, an area including only a part of said plurality of targets is redefined as said readout area, the area including only said part of said plurality of targets that includes the largest area and the smallest area corresponding to said plurality of targets.

10. A pixel signal readout method, comprising:
    detecting a target subject from an effective pixel area of an image sensor, and performing face detection;
    defining a readout area within the effective pixel area, the readout area corresponding to a detected face and being smaller than the effective pixel area;
    reading out only pixel signals within said readout area, utilizing only the pixel signals within the readout area to perform an autofocus operation and changing a period of horizontal and vertical synchronization signals in association with a size of the readout area; and
    redefining a partial area within the readout area as the readout area when a size of an originally defined readout area is greater than a predetermined size.

11. The imaging system according to claim 1, further comprising a selector configured to select one of the original readout area, the redefined readout area or a default readout area and performing an auto focus operation based on the selected area.

12. The imaging system according to claim 1, further comprising altering, during the autofocus operation, a frame rate of the image sensor based upon a size of the readout area.

13. The pixel signal readout method according to claim 10, wherein the detecting comprises automatic tracking of the target within the effective pixel area.

14. The pixel signal readout method according to claim 10, wherein the redefined area comprises a partial area of a face detected area including eyes at a center of the redefined area.

15. The pixel signal readout method according to claim 10, wherein, when the detecting detects a plurality of targets from the effective pixel area and when an area including all of the plurality of targets is larger than the predetermined size, an area including only a part of the plurality of targets is redefined as the readout area.

16. The pixel signal readout method according to claim 10, wherein a preset area is set as the readout area when no target has been detected.

17. The pixel signal readout method according to claim 10, further comprising altering, during the autofocusing operation, a frame rate of the image sensor based on a size of the readout area.

18. The pixel signal readout method according to claim 10, the readout area corresponding to a face detection area enlarged on each side by a predetermined magnification.

19. The pixel signal readout method according to claim 10, wherein the reading out of only pixel signals comprises performing the autofocus operation based on the pixel signals within the readout area and further focusing an optical system of the imaging system on the detected face.

20. The pixel signal readout method according to claim 10, wherein, when the detecting detects a plurality of targets in the effective pixel area, an area including only a part of the plurality of targets is redefined as the readout area, the area including only the part of the plurality of targets includes the largest area and the smallest area corresponding to the plurality of targets.

* * * * *